United States Patent Office 2,918,442
Patented Dec. 22, 1959

2,918,442

HIGH STRENGTH HEAT-RESISTANT NEOPRENE-PHENOLIC ADHESIVE CEMENT

Jack A. Gerrard, Clawson, Mich., and Raymond C. Mattson, Mendota Heights, Minn., assignors to Minnesota Mining and Manufacturing Company, St. Paul, Minn., a corporation of Delaware No Drawing. Application October 27, 1959
Serial No. 846,533

8 Claims. (Cl. 260—29.3)

This invention relates to high strength, heat-resistant elastomeric adhesive and coating compositions, including particularly certain adhesive cement compositions based on polymerized chloroprene, i.e., neoprene, and is in the nature of an improvement over the invention described and claimed in Thomson Patent No. 2,610,910. This application is in the nature of a continuation-in-part of our copending application Serial No. 740,185, filed June 6, 1958, as a continuation of our application Serial No. 412,118, filed February 23, 1954, now abandoned, and the disclosure of Serial No. 740,185 is incorporated herein.

In said Thomson patent there are described liquid elastomeric adhesive cement compositions based on neoprene and capable, when applied to smooth metal surfaces and dried thereon at normal room temperatures, of providing firmly adherent and extremely tough films. The adhesive cement compositions adhere equally firmly to a wide variety of other materials, and have been found valuable in bonding fabric to metal, fabric to wood, metal to rubber, etc. The resulting bond does not require curing at elevated temperatures, but rapidly develops high adhesion and high film strength on drying and aging at normal room temperatures.

One proposed application of adhesive cements is in the bonding of vulcanized sponge rubber to lacquered metal, as in the weatherstripping of automobiles. For this and other applications, the adhesive cement composition must meet a number of requirements. It must dry rapidly at normal room temperatures to form a firm temporary bond, and must thereafter rapidly increase in internal strength as measured both at room temperature and also at elevated temperatures such as are required in the further treatment and use of the automobile bodies. It must provide a strong adhesive bond to the lacquered metal and to the vulcanized rubber. In spite of the required rapid drying, it must remain tacky long enough after application to permit necessary intermediate handling and proper positioning of the coated pieces in production operations. The cement bond must retain a high degree of flexibility and shock-resistance on prolonged aging. It must be at least sufficiently non-thermoplastic to retain the weatherstrip in position under summer temperatures and under continued stress.

One way in which the heat-resistance of such adhesive cement products has been tested is by means of the Fisher softening point test. In this test, a thin coating of the adhesive is spread over a strong fabric surface and allowed to dry for one hour. A layer of the adhesive 0.010 inch thick is then spread over an appropriate portion of the flat face of a ⅛ inch steel plate measuring 1 x 3 inches, the coating is dried for 5 minutes at 25° C., and the coated cloth is pressed firmly against a one square inch area at one end of the coated plate to form a well-bonded joint, which is allowed to air dry for 24 hours at room temperature. The assembly is then hung in an oven, with a 500-gram weight suspended from the fabric, and the oven temperature is raised 10° C. every 15 minutes until the bond breaks or until the maximum test temperature of 163° C. is reached. Samples which attain the maximum test temperature without failure are considered acceptable for commercial weatherstrip application; samples which fail at substantially lower temperatures have given trouble in commercial operations. The adhesive cement compositions of the Thomson patent have not proven effective in this test, the bond failing at temperatures well below 163° C.

The present invention provides adhesive cement compositions which more than meet the temperature requirements of the Fisher softening point test and in addition provide a number of further important advantages. The freshly applied film of cement dries rapidly and rapidly increases in internal strength while still maintaining adequate surface tackiness for successful bonding over desired time intervals, e.g., at least up to about 2 minutes. Within a short time after the bond is completed, the adhesive layer increases remarkably in internal strength and in resistance to plastic flow both at room temperature and more particularly at elevated temperatures. The dried film remains tough and shock-resistant on further aging for periods of up to several years. The cement film adheres firmly to fabric and to lacquered metal surfaces.

The present invention is based on the discovery that coatable liquid compositions as described in the Thomson patent may be modified so as to be capable of forming dried films having greatly improved internal strength over a wide range of temperature, more particularly being capable of withstanding maximum test temperatures in the Fisher softening point test, while suffering substantially no loss in adhesion to metal and other surfaces on which formed, and with no significant decrease in fluidity or spreadability of the liquid product. Such modification is obtained by incroporating alkali or alkaline earth oxides or hydroxides, in relatively large amounts as hereinafter indicated, into mixtures of neoprene and phenolic resin, as illustrated in the following examples.

Compositions based on neoprene normally contain recommended small proportions of acid acceptor material, usually light calcined magnesia, to neutralize the traces of acidic materials released by the neoprene on long aging. Less than five percent of the magnesia, based on the weight of the polymer, is ordinarily recommended and such small amounts are fully adequate for the purpose stated. Other pigments and fillers have also been added to neoprene compositions in varying amounts for various purposes. For example, large amounts of magnesia have been suggested as a reinforcing filler for neoprene vulcanizates such as solid tires; zinc oxide in large amounts is found to cause curing and toughening of many neoprene stocks; potassium hydroxide is known to accelerate the cure of certain vulcanizable neoprene compositions. Relatively small amounts of magnesia or zinc oxide are employed in compositions of the Thomson patent hereinbefore mentioned, and the magnesia reacts with the phenol aldehyde resin, but so far as we are aware, the magnesia does not form a reaction product with the neoprene. Various inert pigments, fillers, fibrous materials, etc., have also been used. However the incorporation of excessive amounts of pigments or fillers in any elastomeric adhesive composition has generally been found to result in lowered adhesion. Surprisingly, the compositions of the present invention maintain a high level of adhesion while still providing greatly improved high-temperature resistance and resistance to flow under stress at normal room temperatures.

Example 1

| Component | Parts by Weight (Based on 100 parts Neoprene) | Parts by Weight (Based on 100 parts phenolic resin) |
|---|---|---|
| Polychloroprene (neoprene Type "CG") | 100 | 100 |
| Light calcined magnesia (optional) | 4 | 4 |
| Potassium hydroxide | 4.5 | 4.5 |
| Zinc oxide (optional) | 5 | 5 |
| Sodium acetate (optional) | 1 | 1 |
| Phenolic resin ("Super-Beckacite 1003") | 100 | 100 |
| Cumarone resin ("Cumar W") (optional) | 30 | 30 |
| Toluol | 400 | 400 |
| Ethyl alcohol | 8 | 8 |
| Water | 4.5 | 4.5 |

The magnesia, zinc oxide and sodium acetate are milled into the polymer on a rubber-mill. The resins are dissolved in the solvents in a paddle type mixer, and the milled base is then added in small pieces and dissolved. The potassium hydroxide is added as a solution in a minimum amount of either water or alcohol, and may be added to the solution either before or after the addition of the milled base. A rather heavy, viscous solution is obtained, which can be spread or brushed out to a smooth thin film. In the Fisher softening point test, test specimens prepared with this adhesive did not fail at the maximum test temperature of 163° C. The adhesive develops excellent adhesion to smooth metal or lacquered metal surfaces when coated and dried thereon.

The "Super-Beckacite 1003" is an example of an oil-soluble heat-hardening phenolic resin fully compatible with the neoprene in the proportions used, and produced by reaction, in the presence of an alkaline catalyst, of formaldehyde with less than an equal mol proportion of a substituted phenol. The specific resin named is produced with a monohydric phenol having only two particularly reaction favorable positions in the nucleus and substituted only in the para position by a side chain radical containing at least four carbon atoms, in this case being para-tertiary-butyl phenol.

The presence of the potassium hydroxide in Example 1 causes the composition to have a strongly alkaline reaction and to be water-sensitive; these possible sources of difficulty are avoided in the following examples.

Example 2

| Component | Parts by Weight (Based on 100 parts Neoprene) | Parts by Weight (Based on 100 parts phenolic resin) |
|---|---|---|
| Polychloroprene (neoprene "AC") | 100 | 143 |
| Light calcined magnesia | 20 | 28.6 |
| Zinc oxide | 5 | 7.1 |
| Sodium acetate | 1 | 1.4 |
| Phenolic resin | 70 | 100 |
| Petrobenzol | 210 | 300 |
| Methyl ethyl ketone | 150 | 214 |
| Toluol | 27 | 38.6 |

The procedure is in accordance with that described under Example 1. The magnesia, together with the zinc oxide and sodium acetate where used, is milled into the polymer and the mill base added to the solution of resin in the volatile solvents. The cement has excellent adhesion to smooth metal and other surfaces, rapidly develops very high bond strength, and meets the maximum temperature requirements of the Fisher softening point test.

In this example the phenolic resin is similar to that of Example 1 with the exception that a small proportion of the monohydric para-substituted phenol is replaced by an equivalent amount of a bis-phenol.

Example 3

The formula and procedure employed are similar to those of Example 2 except that the amount of magnesia is increased to 114 parts and the 100 parts of phenolic resin is replaced by 143 parts of a phenolic resin prepared as described in connection with the resin of Example 1 but using para-phenyl phenol rather than para-t-butyl phenol. Excellent adhesion to metal is obtained with this formula despite the high proportion of magnesia, and the cement meets the maximum temperature requirements of the Fisher softening point test. The duration of tackiness, i.e., the time after spreading during which a fabric or other surface may be adherently bonded to the cement film, is less for the composition of Example 3 than for that of Example 1 or 2 but is still ample for effective commercial utilization of the product on the assembly-line in the weatherstripping of automobiles.

Example 4

| Component | Parts by Weight (Based on 100 parts Neoprene) | Parts by Weight (Based on 100 parts phenolic resin) |
|---|---|---|
| Polychloroprene (neoprene "CG") | 100 | 125 |
| Light calcined magnesia | 4 | 5 |
| Calcium hydroxide | 7.5 | 9.4 |
| Zinc oxide | 5 | 6.2 |
| Sodium acetate | 1 | 1.2 |
| Phenolic resin ("Super Beckacite 1003") | 80 | 100 |
| Pentaerythritol abietate resin ("Pentalyn M") | 30 | 37.5 |
| Petrobenzol | 100 | 125 |
| Hexane | 100 | 125 |
| Methyl ethyl ketone | 50 | 63 |
| Toluol | 200 | 250 |
| Water | 1 | 1.2 |

The adhesive cement solution, prepared as in Example 2, has excellent adhesion to metal, dries and sets up rapidly to a high internal strength, and meets the maximum temperature requirements of the Fisher softening point test.

Example 5

| Component | Parts by Weight (Based on 100 parts Neoprene) | Parts by Weight (Based on 100 parts phenolic resin) |
|---|---|---|
| Polychloroprene (neoprene "W") | 100 | 125 |
| Calcium hydroxide | 40 | 50 |
| Maleic anhydride | 3 | 3.7 |
| Phenolic resin (as in Example 4) | 80 | 100 |
| Cumarone resin (as in Example 1) | 20 | 25 |
| Thermoplastic phenolic resin ("Durez 240") | 10 | 12.5 |
| Petrobenzol | 50 | 62 |
| Toluol | 400 | 500 |
| Ethyl alcohol | 8 | 10 |

"Durez 240" is an oil soluble terpene phenolic resin having a capillary tube melting point of about 335° F.

The adhesive cement is high in adhesion and in heat resistance.

Example 6

The effect of large amounts of alkaline oxide in reducing the cold flow of these neoprene-phenolic compositions is in many cases at least equally as significant as the effect on the strength of the film at elevated temperatures. In testing for cold flow, canvas is adhered to aluminum panels in a manner similar to that employed in preparing the specimens for the Fisher softening point test, and the weight required to cause stripping of the canvass from the panel at an angle of 90 degrees and at about one inch per minute is determined. Typical samples tested as follows:

WEIGHT IN LBS. PER INCH OF WIDTH AT INDICATED TEST TEMPERATURE

| Temperature | 85° F. | 140° F. | 250° F. |
|---|---|---|---|
| Prior art cement | 15 | 7 | 3½ |
| With added MgO | 30 | 17 | 10 |

The formulas of the two cements, in parts by weight, were as follows:

| | Prior Art Cement (Based on 100 parts phenolic resin) | With added MgO (Based on 100 parts phenolic resin) |
|---|---|---|
| Neoprene (type "AC") | 143 | 143 |
| MgO | 5.7 | 5.7 |
| ZnO | 7.1 | 7.1 |
| Sodium acetate | 1.4 | 1.4 |
| Phenolic resin of Ex. 2 | 100 | 100 |
| Petrobenzol | 314 | 314 |
| Methyl ethyl ketone | 214 | 214 |
| Toluol | 42.8 | 42.8 |

While the invention has been described primarily in terms of brushable or sprayable liquid adhesive cement compositions, the same principles are also applicable to the production of highly viscous plastic compositions applied by knife-spreading or the like as mastics, sealers, and other similar coatings. As with the liquid adhesives, these products are found to have high resistance to softening at elevated temperatures, etc., while being capable of forming surprisingly strong adhesive bonds.

The presence of at least a trace of water is found desirable in the compositions of this invention in developing the desired heat-resistance. The water may be added as such, as in Examples 1 and 4, or in connection with water-miscible solvent components. Thus the methyl ethyl ketone of Examples 2 and 6 and the ethyl alcohol of Example 5 each normally contains about 5% of water. One result of the presence of water appears to be a reaction between the phenolic resin and at least a portion of the alkaline additive. As an illustration of this effect, alkaline materials were added to aliquot portions of a solution of the phenolic resin of Example 2, the solutions were evaporated to dryness, and the film was tested for softening temperature and for percent ash of the acetone-soluble fraction. With 40 parts of MgO and 100 parts of resin, and after standing at room temperature for 24 hours, the film from anhydrous methyl ethyl ketone melted at 240° F. and the soluble portion contained zero percent ash. Repeating the test in the presence of added 4 parts of water, the film charred instead of melting, and the ash content of the acetone-soluble portion was 7%. Without intending to be limited by our theory, we hypothesize that in the reaction, in connection with our adhesive compositions, between the MgO alkaline additive and the phenolic resin, MgO molecules (or their hydrolized product) add to two, or sometimes one, phenolic hydroxyls with the expulsion of appropriate quantities of $H_2O$. Where, as we think is usual, the MgO adds to two hydroxyls, these hydroxyls may be adjacent or proximate on the same resin chain, or may exist on different resin chains. In the latter instance a type of cross-linking would occur. In each of our adhesive cement compositions, the reaction product of the phenol-aldehyde resin and the alkaline additive is non-melting at the melting point of the phenol-aldehyde condensation product prior to reaction with the alkaline additive.

These phenolic resins are initially fully compatible with neoprene or with equivalent copolymers of chloroprene with small amounts, e.g., 5%, of other copolymerizable monomers. Compatibility is reduced by the reaction with the alkaline additive, but is still complete within the useful range of up to about 100 parts of the resin on 50 parts of elastomer.

The alkali and alkaline earth oxides and hydroxides in the proportions hereinbefore indicated also have an effect on the heat resistance of a dried residue of a solution of a polychloroprene elastomer. Blends of neoprene "AC" with these materials in various proportions were dissolved and coated on canvas, the coated surfaces pressed together, and the resulting bond permitted to dry. The strips were then heated to 160° F. and separated by stripping, while measuring the amount of stress required. The alkali metals were effective in improving heat resistance but showed a strong tendency to cause gellation of the solution. Such compositions were also difficult to bond because of extremely short periods of tackiness on drying. A composition containing only four parts of MgO on 100 parts of neoprene (in the absence of phenol-aldehyde resin) when tested at 160° F. failed at 5 lbs. per inch of width, or approximately the stress required with neoprene in the absence of any additives. With 40 parts of MgO, again in the absence of phenol-aldehyde resin, the cohesive strength of the bond was increased greatly, but this composition did not adhere to smooth metal surfaces, and does not provide a coating or bond which is firmly adherent to smooth metal surfaces, as do the compositions of our invention.

The hydroxides of sodium, lithium and potassium are effective, for the purposes of our invention (that is, in neoprene phenolic cements which are firmly adherent to smooth metal surfaces and which cure or set at room temperature to form a heat-resistant firm bond and which, as will be demonstrated shortly, contain on the order of ½:1 to 2:1 parts neoprene to phenolic resin), in amounts within the range of about 2½–60 parts based on 100 parts of phenolic resin. Based on 100 parts of neoprene, this amounts to 5–30 parts alkali metal hydroxide. The oxides of these alkalies are also applicable but are too highly reactive for best results. However the high alkalinity and water-solubility of the alkali metal compounds make them much less desirable for the purposes of this invention than the alkaline earth compounds. Somewhat higher amounts of calcium hydroxide than of potassium hydroxide are required to produce the same degree of heat-resistance, the preferred proportions of the former compound being within the range of about 3½–100 parts, based on 100 parts phenolic resin; or 7–50 parts based on 100 parts of neoprene. Calcium hydroxide is stable under normal room conditions and is preferred, although calcium oxide is also effective. Conversely, the hydroxides of magnesium, strontium and barium are effective but are less readily obtainable and hence less desirable than the oxides of these metals. Magnesium oxide, and especially the light calcined product or Examples 2 and 3, is a particularly advantageous alkaline earth metal oxide, serving both as an effective acid acceptor as well as a toughening agent. With this and other alkaline earth oxides, amounts of at least about 10 parts per 100 parts of phenolic resin are required to provide the desired heat-resistance and resistance to cold flow (this amount of the oxide being sufficient both to serve as an acid acceptor and also to react substantially completely with the phenol-aldehyde resin). Up to about 160–200 parts of the alkaline earth oxide, based upon 100 parts of the phenol-aldehyde resin, but not exceeding the amount by weight of neoprene, may be employed, with substantially no decrease in adhesion of the adhesive cement product to smooth metal and other surfaces, and no significant diminution of fluidity of the solution.

On the other hand, it has been observed that compositions having the same base formula but containing equally large amounts of non-alkaline pigments or other additives are deficient not only in heat-resistance but also in the ability to adhere firmly to smooth metal. For example, a composition which showed excellent adhesion and provided an effective bond at 163° C. when made with 60 parts of MgO was found to be low in adhesion and to fail at 50–60° C. when the MgO was replaced by ZnO. Again, compositions consisting mainly of neoprene and phenolic resin, with or without alkaline additives and which adhered firmly to smooth metal and formed tough, shock-resistant films, were found to be almost completely non-adherent to metal and to form brittle dried masses when filled with large amounts, e.g., a major proportion, of inert fillers such as clay or powdered fibrous magnesium silicate.

The hitherto defined phenolic resin component is also required to be present within certain limiting proportions in order to obtain the most advantageous combination of properties from compositions embodying the principles of this invention. Other resinous components do not in general provide the desired high heat resistance nor, in the presence of large amounts of the alkaline additives, do they provide the desired high adhesion to metal and other surfaces. For example, 100 parts of a permanently thermoplastic oil-soluble terpene-modified phenolic resin having a capillary tube melting point of 270° F. ("Durez 12603") combined with 100 parts of neoprene and 16 parts of hydrated lime in a suitable solvent mixture produced a composition which showed poor adhesion to metal even though meeting the 163° C. softening-point test. In another example using 100 parts of zinc rosinate (pale "Zitro" resin) and 40 parts of MgO with 100 parts of neoprene, the adhesion to metal was even lower. Hence, although high heat-resistance of neoprene compositions may be obtained in the absence of phenolic or other resinous components, the objects of our invention, in providing highly adherent and heat-resistant elastomeric adhesive cement compositions having a neoprene base, and which will cure at ordinary room temperatures, are attained only with compositions consisting mainly of a mixture of 100 parts of neoprene, about 50–200 parts of oil soluble heat-hardening phenol-aldehyde resin, or conversely 100 parts of said phenol-aldehyde resin and 50–200 parts of neoprene together with an amount of an alkaline additive sufficient at least substantially completely to react with said resin and thereby to impart high heat resistance to said adhesive cement without substantially reducing the adhesion thereof to smooth metal surfaces. The amount of the alkaline additive employed thus falls within the approximate limits (based on 100 parts of phenolic resin) of 2½–60 parts of NaOH, KOH or LiOH, 3½–100 parts of Ca(OH)$_2$, or 10–200 parts of MgO, BaO, or SrO, or equivalent amounts of other equivalent alkali or alkaline earth metal oxides or hydroxides, but in no case in an amount in excess of approximately the weight of the neoprene.

In each of Examples 2 to 5, above, the magnesium oxide and/or equivalent alkaline earth metal oxide is present in a lesser amount by weight than the phenol-aldehyde resin condensation product, but always in a sufficient amount substantially completely to react with the phenol-aldehyde resin condensation product. Example 1 employs a combination of alkali metal hydroxide and alkaline earth metal oxide, and is less desirable than the other examples, as previously pointed out.

While we illustrate our invention by a number of examples, and contemplate variations therefrom, the amount of magnesium or other alkaline earth metal oxide, or the like, should not be increased so far beyond the examples as to injuriously affect the adhesion of the cement to smooth metal surfaces; nor should it be decreased so far below that illustrated that it will not be sufficient substantially completely to react with the phenol-aldehyde resin so as to impart heat resistance.

We claim:

1. A liquid resinous elastomeric coating composition capable of providing a tough, flexible, shock-resistant and heat-resistant, firmly adherent, dried coating on a smooth metal surface and being a smooth uniform mixture, in a volatile liquid organic solvent, of components consisting essentially of (1) about 50–200 parts by weight of polymerized chloroprene and (2) the inter-reacted mixture of (a) 100 parts of oil-soluble heat-hardening phenol-aldehyde resinous condensation product of formaldehyde and a substituted phenol compatible with said polymer and (b) about 10–200 parts of magnesium oxide, providing a reaction product of the phenol-aldehyde resin and magnesium oxide which is non-melting at the melting point of said phenol-aldehyde condensation product.

2. A liquid resinous elastomeric coating composition capable of providing a tough, flexible, shock-resistant and heat-resistant, firmly adherent, dried coating on a smooth metal surface and being a smooth uniform mixture, in a volatile liquid organic solvent, of components consisting essentially of (1) about 50–200 parts by weight of polymerized chloroprene and (2) the inter-reacted mixture of (a) 100 parts of oil-soluble heat-hardening phenol-aldehyde resinous condensation product of formaldehyde and a substituted phenol compatible with said polymer and (b) magnesium oxide in an amount sufficient substantially completely to react with said phenol-aldehyde condensation product and within the range of about 10–200 parts, providing a reaction product of the phenol-aldehyde resin and magnesium oxide which is non-melting at the melting point of said phenol-aldehyde condensation product.

3. A liquid resinous elastomeric coating composition capable, when coated on a smooth metal surface and dried thereon, of becoming firmly bonded to said surface, of rapidly becoming firm, strong and heat-resistant on mere evaporation of solvent at normal room temperatures, and, in the fully dried state, of sustaining a shear load of 500 grams per square inch at a temperature of 163° C.; said coating composition being a smooth uniform mixture, in a volatile liquid organic solvent, of components consisting essentially of (1) about 50–200 parts by weight of polymerized chloroprene and (2) the inter-reacted mixture of (a) 100 parts of oil-soluble heat-hardening phenol-aldehyde resinous condensation product of formaldehyde and a substituted phenol compatible with said polymer and (b) magnesium oxide in an amount sufficient substantially completely to react with said phenol-aldehyde condensation product but not exceeding about 200 parts, providing a reaction product of the phenol-aldehyde resin and magnesium oxide which is non-melting at the melting point of said phenol-aldehyde condensation product.

4. An adhesive cement composition in the form of a smooth uniform mixture, in a volatile organic liquid solvent, of components consisting essentially of about 50–200 parts by weight of polymerized chloroprene, 100 parts of a heat-hardening phenol-aldehyde resinous condensation product of formaldehyde and a substituted phenol and which is compatible with the polymer, and an alkaline additive of the group consisting of (a) about 2½–60 parts of alkali metal hydroxide, (b) about 2½–100 parts of calcium hydroxide, (c) about 10–200 parts of magnesium oxide, (d) about 10–200 parts of barium oxide, and (e) about 10–200 parts of strontium oxide; said composition forming tough and shock-resistant, firmly adherent, dried film coatings on smooth metal surfaces.

5. A liquid resinous elastomeric coating composition capable of providing a tough, flexible, shock-resistant and heat-resistant, firmly adherent, dried coating on a smooth metal surface and being a smooth uniform mixture, in a volatile liquid organic solvent of components consisting essentially of (1) about 50–200 parts by weight of polymerized chloroprene and (2) the inter-reacted mixture of (a) 100 parts of oil-soluble heat-hardening phenol-aldehyde resinous condensation product of formaldehyde and a substituted phenol compatible with said polymer and (b) an alkaline additive in an amount sufficient substantially completely to react with the said phenol-aldehyde condensation product, said alkaline additive not exceeding in amount the respective proportions hereinafter set forth and being from the group consisting of (i) about 2½–60 parts of alkali metal hydroxide, (ii) about 3½–100 parts of calcium hydroxide, (iii) about 10–200 parts of magnesium oxide, (iv) about 10–200 parts of barium oxide, and (v) about 10–200 parts of strontium oxide, providing a reaction product which is non-melting at the melting point of said phenol-aldehyde condensation product.

6. A liquid adhesive cement composition, in the form of a smooth uniform mixture in a volatile organic liquid solvent containing at least a trace and not more than about 5 percent of its weight of water, of components consisting essentially of 100 parts by weight of polymerized chloroprene, about 60–100 parts of heat-hardening phenol-aldehyde resinous condensation product of formaldehyde and a substituted phenol and which is compatible with the polymer, and about 40–130 parts by weight of magnesium oxide per 100 parts of said phenol-aldehyde condensation product; said magnesium oxide reacting with said phenol-aldehyde resinous condensation product to provide a composition forming tough, shock-resistant and heat-resistant, firmly adherent, dried film coatings on smooth metal surfaces.

7. A liquid resinous elastomeric adhesive coating composition capable of providing a tough, flexible, shock-resistant and heat-resistant, firmly adherent, dried coating on a smooth metal surface and being a smooth uniform mixture, in a volatile liquid organic solvent, of components consisting essentially of (1) about 50–200 parts by weight of polymerized chloroprene and (2) the inter-reacted mixture of (a) 100 parts of oil-soluble heat-hardening phenol-aldehyde resinous condensation product of formaldehyde and a substituted phenol compatible with said polymer and (b) calcium hydroxide in an amount sufficient substantially completely to react with said phenol-aldehyde condensation product and within the range of about 10–200 parts, providing a reaction product of the phenol-aldehyde resin and magnesium oxide which is non-melting at the melting point of said phenol-aldehyde condensation product.

8. A liquid resinous elastomeric coating composition capable of providing a tough, flexible, shock-resistant and heat-resistant, firmly adherent, dried coating on a smooth metal surface and being a smooth uniform mixture, in a volatile liquid organic solvent, of components consisting essentially of (1) about 50–200 parts by weight of polymerized chloroprene and (2) the inter-reacted mixture of (a) 100 parts of oil-soluble heat-hardening phenol-aldehyde resinous condensation product of formaldehyde and a monohydric phenol having only two particularly reaction favorable positions in the nucleus and substituted only in the para position by a side chain radical containing at least four carbon atoms, said phenol-aldehyde resin being compatible with said polymerized chloroprene and (b) magnesium oxide in an amount sufficient substantially completely to react with said phenol-aldehyde condensation product but not exceeding about 200 parts, providing a reaction product of the phenol-aldehyde resin and magnesium oxide which is non-melting at the melting point of said phenol-aldehyde condensation product.

No references cited.

UNITED STATES PATENT OFFICE

CERTIFICATE OF CORRECTION

Patent No. 2,918,442            December 22, 1959

Jack A. Gerrard et al.

It is hereby certified that error appears in the printed specification of the above numbered patent requiring correction and that the said Letters Patent should read as corrected below.

Column 4, line 16, for "Example 1 or 2" read -- Examples 1 or 2 --; column 5, line 20, in the table, third column thereof, under the heading "With added MgO (Based on 100 parts phenolic resin)", second line, for "5.7" read -- 57 --; column 6, line 55, for "product or" read -- product of --; column 10, lines 8 and 9, for "magnesium oxide" read -- calcium hydroxide--.

Signed and sealed this 23rd day of August 1960.

(SEAL)
Attest:

KARL H. AXLINE            ROBERT C. WATSON
Attesting Officer           Commissioner of Patents